United States Patent [19]

Brusasco

[11] 4,186,621
[45] Feb. 5, 1980

[54] SCREW-NUT SCREW TRANSMISSION COUPLING

[75] Inventor: Enzo Brusasco, Turin, Italy

[73] Assignee: Roltra S.p.A., Turin, Italy

[21] Appl. No.: 918,111

[22] Filed: Jun. 22, 1978

[30] Foreign Application Priority Data

Jul. 7, 1977 [IT] Italy ............... 68574 A/77

[51] Int. Cl.² ............................................. F16N 55/04
[52] U.S. Cl. ..................................................... 74/459
[58] Field of Search ................. 74/459, 89.15, 424.8 R

[56] References Cited
U.S. PATENT DOCUMENTS

| 2,833,156 | 5/1958 | Spontelli | 74/459 |
| 3,815,435 | 6/1974 | Eschenbacacher et al. | 74/459 |

Primary Examiner—Doris L. Troutman
Attorney, Agent, or Firm—Ladas, Parry, Von Gehr, Goldsmith & Deschamps

[57] ABSTRACT

A screw-nut screw transmission coupling in which a tubular outer innerly-grooved sleeve and an inner outerly-grooved elongate member are coupled to define a plurality of endless ducts for circulation of a plurality of ball bearings; each said endless duct being formed by two adjacent turns of a helical duct defined by said outer sleeve and said inner elongate member, and a return duct extending through a respective through bore provided through said sleeve and straddling said two adjacent turns, said return duct being defined by a cavity provided in a plate fixed to the outer surface of said sleeve and closing said through bore.

5 Claims, 6 Drawing Figures

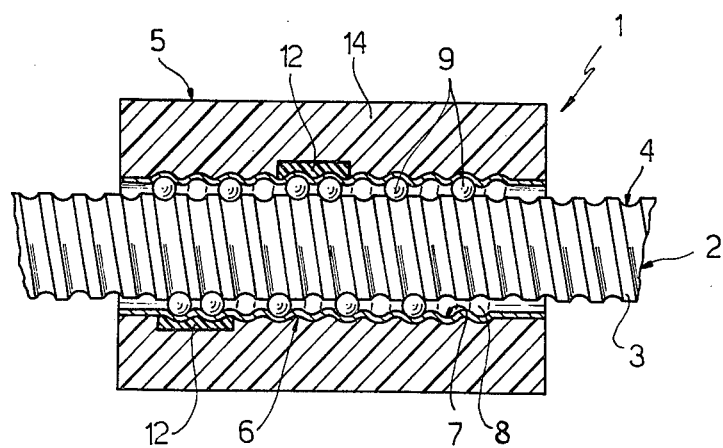
Fig. 1
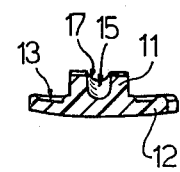
Fig. 4
Fig. 3
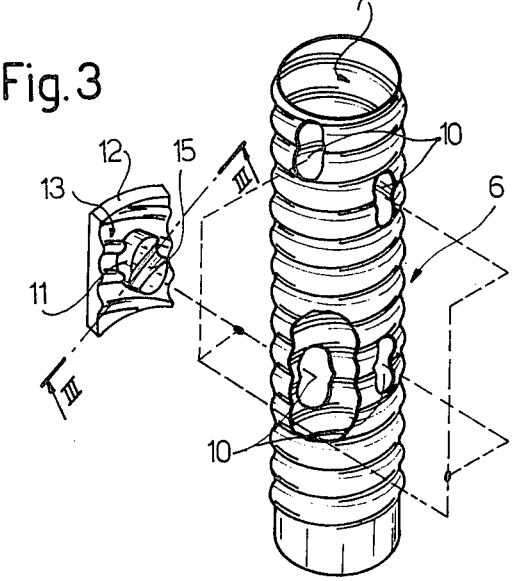
Fig. 2

SCREW-NUT SCREW TRANSMISSION COUPLING

The present invention relates to an improved screw-nut screw transmission coupling.

According to the invention there is provided a screw-nut screw transmission coupling comprising a tubular outer member and an elongate inner member having complementary helical grooves cooperating to define a helical ball bearing duct; a plurality of return ducts extending between corresponding points of respective pairs of adjacent turns of said helical ball bearing duct to define therewith a plurality of endless ball bearing ducts; and a plurality of ball bearings arranged in mutual engagement within each said endless duct; said tubular outer member comprising a tubular sleeve provided internally with one of said helical grooves and with a plurality of radial through bores, each said bore straddling a respective pair of adjacent turns of said internal helical groove and having a diameter substantially equal to the width of said pair of turns, and a plurality of plates coupled to the outer surface of said sleeve and each arranged to close a respective one of said through bores; each said return duct being in the form of a cavity provided in each said plate.

Further characteristics and advantages of the present invention will be evident from the description given hereinafter with reference to the accompanying drawings in which:

FIG. 1 is a diagrammatic axial section through a screw-nut screw coupling with ball circulation constructed in accordance with the present invention;

FIG. 2 is an exploded perspective view of a detail of FIG. 1, with parts removed for clarity;

FIG. 3 is a section on the line III—III of FIG. 2;

FIG. 4 is a section on the line IV—IV of FIG. 3;

Figure 6:
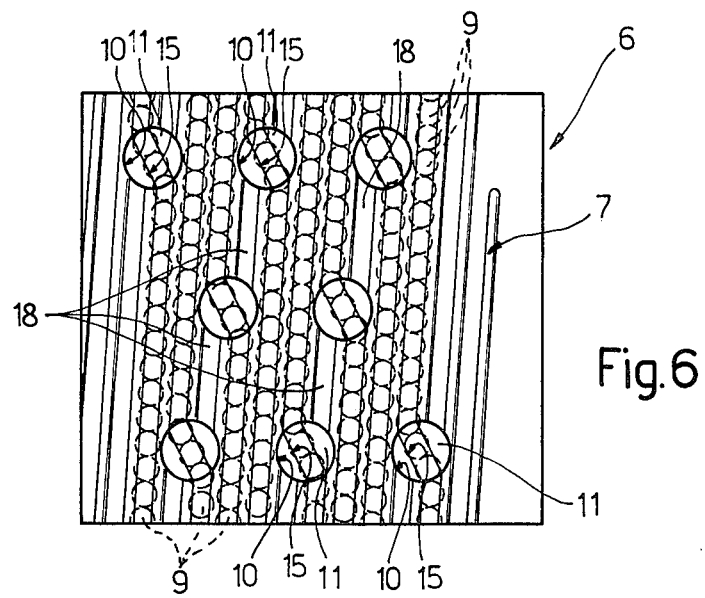
FIG. 6 is analogous to FIG. 5 and relates to an alternative embodiment of the detail of FIG. 2.

FIG. 1 shows a screw-nut screw coupling indicated overall by 1 and comprising two mutually coupled members of which the first, indicated by 2, is an elongated element consisting of a screw comprising a single-start thread 3 defining a helical groove 4 of substantially semi-cylindrical cross-section, and the second, indicated by 5, is a tubular element through which the screw 2 extends with radial slack. The tubular element 5 comprises a tubular member 6 of substantially cylindrical cross-section, preferably constructed of rolled and hardened steel sheet and shaped to define on its inner surface a helical groove 7 of substantially semi-cylindrical cross-section conjugate with the groove 4 to define, with this latter, a helical path 8 for a plurality of balls 9.

As shown in particular in FIG. 2, the tubular member 6 comprises a plurality of radial through bores 10 of substantially circular shape, each of which sraddles a respective pair of adjacent turns of the groove 7 and has a diameter substantially equal to the width of said pair of turns.

A cylindrical appendix 11 engages in each bore 10 and extends radially from the centre of a respective curved plate 12 comprising a grooved surface 13 which mates with the outer surface of the tubular member 6. Each plate 12 is embedded, as shown in FIG. 1, in an outer sleeve 14 preferably constructed of plastics material and formed over the tubular member 6.

At the free end of each appendix 11 there is provided a cavity which, as shown in FIG. 2 and in particular in FIGS. 3 and 4, is defined by a groove 15 extending in a diametrical direction forming an angle other than zero with the turns of the groove 7. In particular, said angle has a value such that for each appendix 11, the relative groove 15 connects together the opposing ends of one and the same turn of the groove 7 at the relative bore 10.

As shown in FIG. 3, in the direction of its axis the groove 15 has a curved contour 16 the convexity of which faces the relative appendix 11 and is such that the maximum depth of the groove 15 is at least equal to the diameter of the balls 9.

As shown in FIG. 4, the groove 15 opens into the lateral surface of the relative appendix 11 by way of two end notches 17 extending axially along the appendix 11 and each having a substantially semi-cylindrical cross-section equal to that of the helical groove 7.

In use, the balls 9 do not roll along the entire groove 7 as is normally the case, but only along that turn of this latter in which they are mounted and which has its opposing ends disposed at the periphery of one of the bores 10. Each ball 9 travels along an annular path consisting only of a single turn of the groove 7 and the groove 15 which connects together the two opposing ends of said turn. In this respect, the return of each ball 9 to the commencement of the turn through which it has just travelled is made possible both by the depth of the groove 15, which enables the ball 9 to disengage from the groove 4 of the screw 2, and by the fact that the balls 9 are mounted in strict contact with each other along the entire aforesaid annular path, and transfer pressure from one to the other to aid their movement in contact with the contour 16 during their travel along the relative groove 15.

Figure 5:
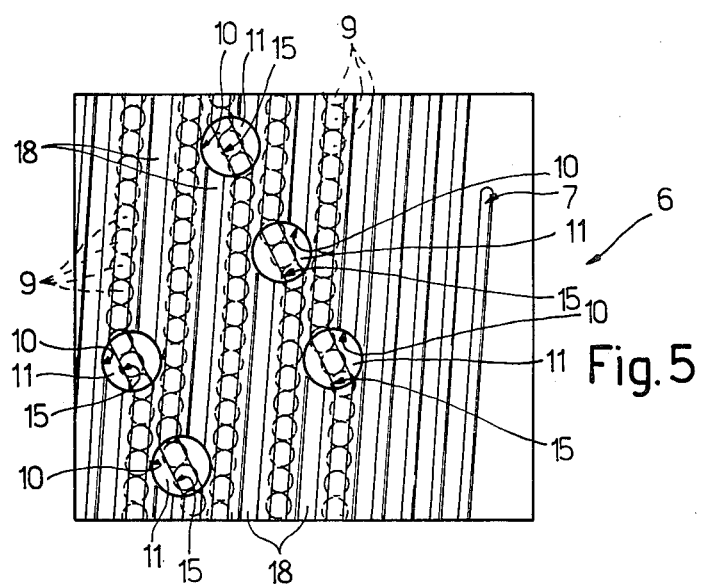
FIG. 5 shows the development of the detail of FIG. 2 in one plane.

From a comparison of FIGS. 5 and 6, it can be seen that the distribution of the bores 10 is of the maximum importance with regard to the maximum load which may be supported by the described screw-nut screw coupling. In this respect, it can be seen in FIGS. 5 and 6 that there are some portions 18 of the groove 7 which are not traversed by the balls 9, the length of these portions depending upon the distribution of the bores 10. From these figures it can be seen that the length of said portions 18 becomes shorter the closer any bore 10 becomes to the next bore 10 along the groove 7 in the direction of movement of the balls 9, and that the member 6 shown in FIG. 6 may be coupled to its screw 2 in a more stable and robust manner than in the case of the member 6 of FIG. 5, because of the greater number of balls 9 which may be used in the former case.

Numerous modifications are possible to the described coupling within the inventive concept, without leaving the scope of the present invention.

What we claim is:

1. A screw-nut screw transmission coupling comprising a tubular outer member and an elongate inner member having complementary helical grooves cooperating to define a helical ball bearing duct; a plurality of return ducts extending between corresponding points of respective pairs of adjacent turns of said helical ball bearing duct to define therewith a plurality of endless ball bearing ducts; and a plurality of ball bearings arranged in mutual engagement within each said endless duct;

said tubular outer member comprising a tubular sleeve provided internally with one of said helical grooves and with a plurality of radial through bores, each said bore straddling a respective pair of adjacent turns of said internal helical groove and having a diameter substantially equal to the width of said pair of turns, and a plurality of plates coupled to the outer surface of said sleeve and each arranged to close a respective one of said through bores; each said return duct being in the form of a cavity provided in each said plate.

2. A coupling as claimed in claim 1, further comprising a further sleeve arranged outside said sleeve and rigidly connected to the outer surface thereof, said plates being embedded in said further sleeve.

3. A coupling as claimed in claim 1, wherein each said plate is provided with an extension engaging the respective bore and extending therethrough, said cavity being provided at the free end of said extension.

4. A coupling as claimed in claim 3, wherein each said cavity is defined by a groove provided at the end of the respective extesion in a diametrical direction which forms an angle other than zero with said turns, said groove comprising in said diametrical direction a curved contour with its convexity facing said extension and opening into the lateral surface of this latter by way of two axial end notches of semi-cylindrial cross-section, each of said notches mating with said inner helical groove at the periphery of said bore.

5. A coupling as claimed in claim 1, wherein said cavity has a depth at least equal to the diameter of said ball bearings.

* * * * *